PULSE MODULATED SPEECH TRANSMISSION SYSTEM

Filed May 15, 1951 2 Sheets-Sheet 1

INVENTOR
STANLEY R. RICH

BY [signature] [signature]

ATTORNEYS

Sept. 14, 1954 S. R. RICH 2,689,344

PULSE MODULATED SPEECH TRANSMISSION SYSTEM

Filed May 15, 1951 2 Sheets-Sheet 2

INVENTOR
STANLEY R. RICH

BY A. H. Helvestine
George Sipkin
ATTORNEYS

Patented Sept. 14, 1954

2,689,344

UNITED STATES PATENT OFFICE 2,689,344

PULSE MODULATED SPEECH TRANSMISSION SYSTEM

Stanley R. Rich, West Hartford, Conn.

Application May 15, 1951, Serial No. 226,519

4 Claims. (Cl. 343—6)

(Granted under Title 35, U. S. Code (1952), sec. 266)

The device herein described may be manufactured and used by or for the Government of the United States of America without the payment of any royalty thereon or therefor.

The present invention relates to a pulse-modulated transmitter and more particularly to a pulse modulated transmitter for transmitting sound.

The present invention is a continuation-in-part of my patent application, Serial No. 618,377, filed September 24, 1945, for Zero Point Impulse Modulation, now abandoned.

Pulse transmitters have been widely used in radar, and for transmitting telephone messages, because of the long range of equipment of low average power made possible by employing short bursts of high power rather than a continuous carrier wave. Present systems for transmitting speech by means of pulses operate by varying the spacing between pairs of pulses, and therefore require complicated equipment for generating and controlling the transmitted pulse pairs, and because of the complexity of the equipment, it is difficult if not impossible to modify existing radar equipment for use as speech transmitting equipment.

The present invention is directed to transmitting speech using conventional radar equipment with only slight changes in the equipment by varying the pulsing rate of the transmitter in accordance with the audio frequency to be transmitted. It will also be apparent that the radar equipment may be used for echo ranging at the same time that it is used for transmitting intelligence to a distant point, enabling communication with aircraft in flight. The invention makes use of a special characteristic of standard pentode tubes which effectively limits the amplitude of its output and produces a square wave having the frequency of the input signal.

It is an object of the present invention to provide a pulse modulated speech transmission system employing a modulated pulse rate.

It is a further object of the present invention to provide a pulse-modulated speech transmitter in which the pulsing rate of the transmitter is controlled by a frequency modulated oscillator.

It is a still further object of the present invention to provide a system for modifying existing radar equipment for speech transmission.

It is a still further object of the present invenion to provide a pulse modulated speech transmitter employing a special characteristic of pentode tubes.

Other objects and advantages of the present invention will be made apparent to those skilled in the art by reference to the following description and to the appended drawings in which.

Figures 1, 2, 3, 4, 5, 6, 7:
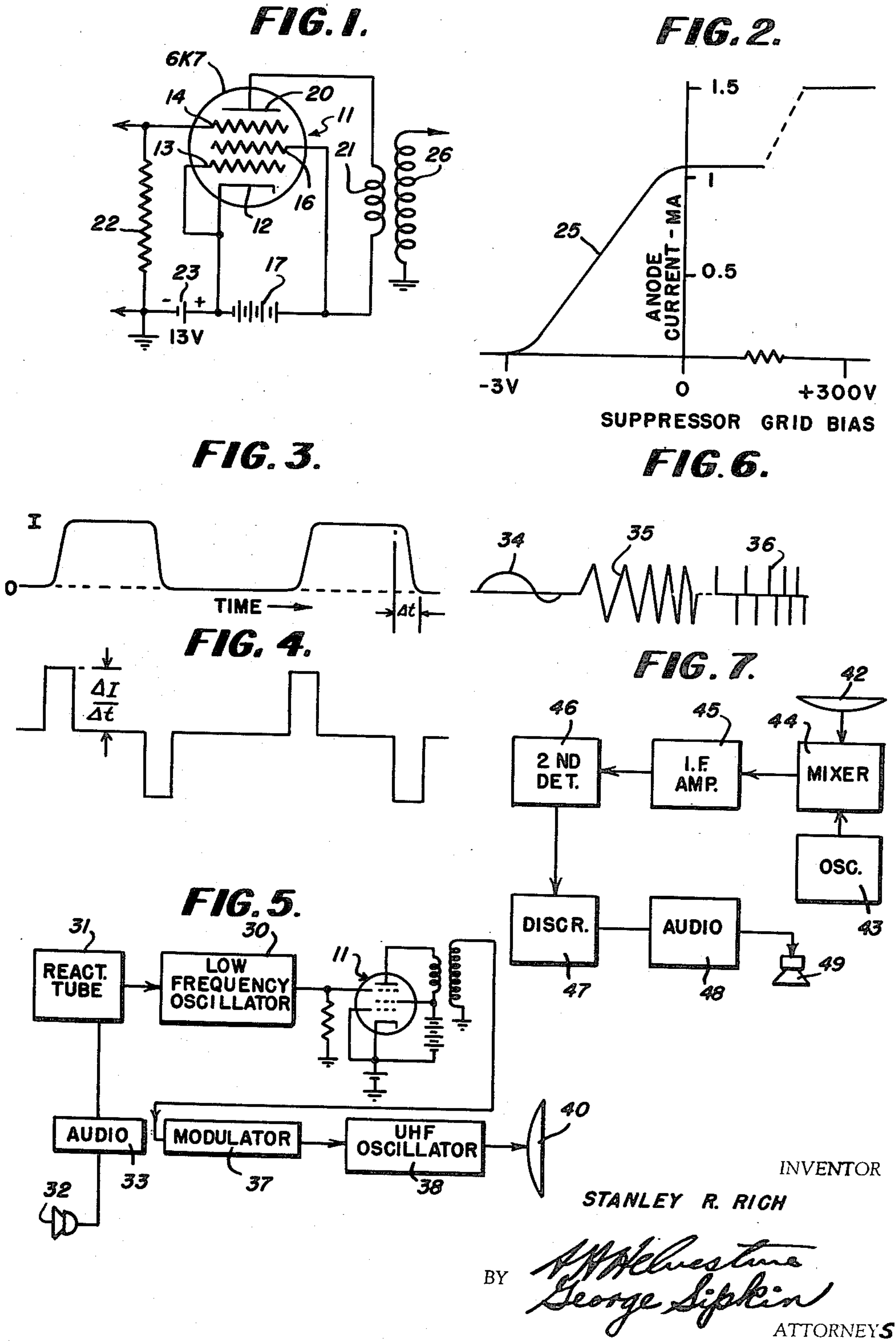
Fig. 1 is a schematic diagram of a pentode tube as used in connection with the present invention.
Fig. 2 is a chart showing the operation of the circuit of Fig. 1.
Figs. 3 and 4 are diagrams further showing the operation of the circuit shown in Fig. 1.
Fig. 5 is a block diagram of a pulse modulated transmitter embodying the present invention.
Fig. 6 is a graph explaining the operation of the device illustrated in Fig. 5.
Fig. 7 is a block diagram of a receiver usable with the speech transmitter of Fig. 5.

Referring now to the drawings, there is shown in Fig. 1 a pentode tube 11, such as the RCA type 6K7, which is operated with its cathode 12 connected to the control grid 13, and the input signal is applied to the suppressor grid 14. The screen grid 16 is connected to a source of low potential direct current, such as the battery 17, and the anode 20 is connected to the screen grid 16 through an inductance 21. A grid resistance 22 is connected between the suppressor grid 14 and ground, and a bias battery 23 is also provided.

It has been found by experiment that the anode current of the tube 11 varies as shown in Fig. 2. For the purposes of illustration, the battery 17 may have a voltage in the vicinity of 10 volts. Under these conditions, no current flows in the anode circuit when the suppressor grid 14 is made approximately 3 volts negative with respect to cathode 12, and the anode current rises at a substantially linear rate with an increase toward positive of the suppressor grid potential until the suppressor grid 14 is at approximately zero potential at which time the anode current is approximately 1.1 milliamperes. A further increase in the suppressor grid voltage produces a very slight increase in anode current, a positive 300 volt potential on the suppressor grid 14 producing a current of only 1.5 milliamperes. This characteristic is illustrated by the curve 25. As illustrated in Fig. 1, the tube 11 is biased substantially to cut-off, so that negative voltages applied to the suppressor grid 14 have no effect on the anode current of the tube.

If a sine wave voltage having an amplitude in excess of approximately 3 volts is applied to the grid 14 of the tube 11, the anode current does not follow the sine wave, but produces a trapezoidal wave illustrated in Fig. 3. It will be apparent to those skilled in the art that the circuit herein described effectively limits the amplitude of the plate current to substantially 1.1 milliamperes. The anode current passing through the inductance 21 induces a voltage therein when the current is changing so as to produce a series of short pulses during periods of current change as shown in Fig. 4. The inductance 21 therefore acts as a differentiating circuit for the anode current. The voltage produced across the inductance 21 may be employed to directly excite following stages in well-known fashion, or a second inductance 26 may be coupled to the inductance 21 to produce a voltage of higher or lower magnitude through transformer action. The operation of this circuit is explained in my patent application No. 538,801, filed September 24, 1945, now Patent No. 2,450,443, issued October 5, 1948.

Referring to Fig. 5, the tube 11 is excited by the low-frequency oscillator 30 having a normal frequency of three or more times the maximum audio frequency to be transmitted, such as 10 to 15 kilocycles when voice frequencies are used. The frequency of the oscillator 30 is controlled by any convenient type of frequency modulation equipment, such as the well-known reactance tube shown by the symbol 31, the reactance tube circuit 31 being controlled by the audio amplifier 32. The frequency of the oscillator 30 is modified in accordance with the envelope of the audio signal as shown by curve 34 of Fig. 6, the output of the tube 11 being illustrated by the curve 25. An inspection of the curves will illustrate that a pulse is formed by the inductance 21 at the frequency of the exciting wave and at approximately the time the exciting wave passes through zero potential.

If the modulator of an ultra-high frequency pulse transmitter is adapted to be triggered by either a positive or a negative pulse, pulses of the opposite polarity are ineffective, and since the output voltage of the inductance 26 contains both, it may be directly connected to control such a modulator. As shown in Fig. 5, the audio amplifier 31 controls the reactance tube 31, which in turn controls the frequency of the oscillator 30. The tube 11 produces a pulse of the desired polarity for each cycle of the output of the oscillator 30, and the modulator 37 causes the high frequency oscillator 38 to generate a corresponding pulse which is radiated frequency modulation equipment, such as the well-known reactance tube circuit indicated by the symbol 31, the reactance tube circuit 31 being controlled by any suitable audio frequency, such as the output of the microphone 32 amplified in the audio frequency amplifier 33. The frequency of the oscillator 30 therefore varies with the amplitude of the output of the microphone 32, as indicated by the curves 34 and 35 in Fig. 6. The voltage induced in the winding 26 is indicated by the curve 36, and is applied to the modulator 37 which excites the ultra-high frequency oscillator 34 to radiate a pulse through the antenna 40 in response to each positive pulse applied thereto from the tube 11.

Fig. 7 illustrates a receiver suitable for use with the transmitter of Fig. 5, in which signals received by the antenna 42 are combined with the output of the oscillator 43 in the mixer circuit 44 to produce a signal having a desired intermediate frequency, which signal is amplified in the intermediate frequency amplifier 45. The amplified output of the amplifier 45 is demodulated in the detector 46, the output of which has the same frequency as the oscillator 30 of Fig. 5. The output of the detector 46 is impressed on a frequency discriminator 47 resonant at the basic frequency of the oscillator 30, which produces an audio output corresponding to the output of the microphone 32, this audio output being amplified in the audio amplifier 48 and converted into sound by the loudspeaker 49.

Figure 8:
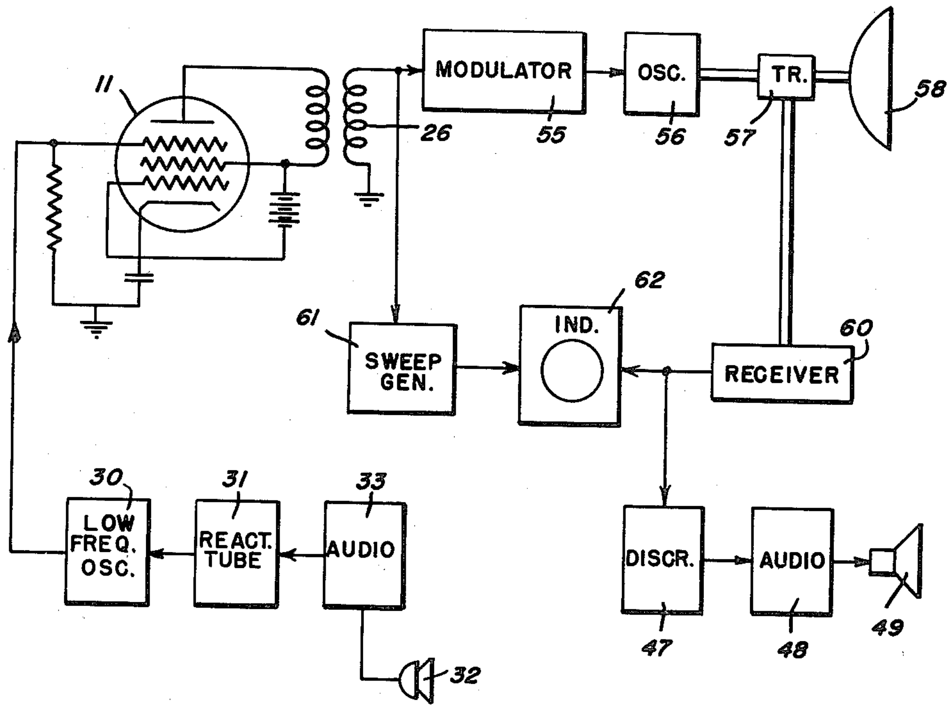
Fig. 8 is a block diagram of the present invention as applied to a separately excited radar system.

It will be readily apparent to those skilled in the art that the output of the detector 46 may be applied to the indicators of a radar system in addition to being applied to the audio system described in Fig. 7, thus producing a combined communication system and echo ranging system. Such a system is illustrated in Fig. 8, in which the modulator 55, oscillator 56, transmit-receive switch 57, and antenna 58 may be similar to a conventional radar transmitter, as may the receiver 60, the sweep generator 61, and the indicator 62. The sweep generator 61 and the modulator 55 should be arranged to be controlled by pulses of the same polarity. The modulator 55 energizes the oscillator 56 to produce pulses which are radiated by the antenna 58 whenever a pulse is applied from the coil 26, and the number of pulses radiated is therefore determined by the frequency of the oscillator 30. The frequency of the oscillator is in turn varied in accordance with the amplitude of the sound striking the microphone 32, the variation required being a small percentage of the oscillator frequency. The output of the receiver 60 is impressed on the discriminator 47, and the output of the discriminator 47 is amplified by the audio amplifier 48 and reproduced by the loudspeaker 49.

However, pulses applied to the sweep generator 61 from the coil 26 trigger the sweep generator which applies a sweep voltage to the indicator 62, and pulses from the receiver 60 are impressed on the indicator in the conventional manner to provide range measurement for the radar system.

It should be understood, of course, that the foregoing disclosure relates to only preferred embodiments of the present invention and that it is intended to cover all changes and modifications of the examples of the invention, herein chosen for the purposes of the disclosure, which do not constitute departures from the spirit and scope of the invention as set forth in the appended claims.

Having thus described the invention, what is claimed is:

1. In a combined echo ranging and communication system, an ultra-high-frequency pulse generator radiating energy toward a remote target, a pulse keyer controlling the energization of said pulse generator in response to an operating pulse applied thereto, a source of alternating current having a sub-carrier frequency, means for frequency modulating said source of alternating current in response to audible signals to be transmitted, a pentode amplifier tube having a positive voltage on its anode and screen grid, its control grid connected to its cathode, and its suppressor grid negatively biased with respect to its cathode, means for impressing said frequency modulated alternating current on the suppressor grid of said pentode tube to produce an operating pulse during each cycle of said frequency-modulated alternating current, means for impressing said operating pulses on said pulse keyer, receiving means responsive to reflected ultra-high-frequency pulses, time-measuring means responsive to said pulse keyer and said receiver for indicating range to said target, and receiving means at said target responsive to pulse modulated signals whereby the radiated pulses from said ultra-high-frequency generator transmit audible communication signals and simultaneously indicate range to said target.

2. In a combined echo ranging and communication system, a pulsed transmitter adapted to radiate a pulse of ultra-high-frequency energy of predetermined duration to a remote target in response to the application of an operating pulse thereto, receiving means responsive to reflected pulses from said remote target, and time-measuring means responsive to a radiated pulse and a reflected pulse to indicate the range to said remote target, means for producing a sub-carrier frequency modulated by intelligible signals, means for producing operating pulses at a frequency corresponding to the frequency of said sub-carrier frequency and applying said operating pulses to said pulsed transmitter, whereby said intelligible signals are transmitted by the pulse rate of said transmitter.

3. In a communication system, a pulse transmitter controllable by application thereto of a signal pulse to transmit a pulse of radiant energy, a source of alternating current voltage having a frequency determined by intelligence to be transmitted, a pentode tube having its control grid and cathode grounded and its anode and screen grid at a positive potential, means for impressing said alternating current voltage on the suppressor grid of said pentode tube, whereby to produce a square wave of a frequency corresponding to the frequency of said alternating current voltage, differentiating means connected to the anode of said pentode tube to produce signal pulses at a rate corresponding to the frequency of said square wave, and means for impressing said signal pulses on said pulse transmitter, whereby the intelligence is communicated by the pulsing rate of said pulse transmitter.

4. In a communication system as claimed in claim 3 but further characterized by a high frequency receiver for receiving said pulses of radiant energy, rectifying means for rectifying said pulse signals and frequency-discriminator means connected to said rectifying means to produce the modulation corresponding to the intelligence transmitted by the pulsing rate of said transmitter.

References Cited in the file of this patent

UNITED STATES PATENTS

| Number | Name | Date |
|---|---|---|
| 2,407,199 | Wolff | Sept. 3, 1946 |
| 2,411,130 | Evans | Nov. 12, 1946 |
| 2,426,225 | Krause | Aug. 26, 1947 |
| 2,440,264 | Grieg | Apr. 27, 1948 |
| 2,489,852 | Bishop | Nov. 29, 1949 |
| 2,495,737 | Labin et al. | Jan. 31, 1950 |
| 2,542,182 | Crump | Feb. 20, 1951 |
| 2,566,331 | Huber et al. | Sept. 4, 1951 |
| 2,605,464 | Moore | July 29, 1952 |